(12) United States Patent
Kim

(10) Patent No.: US 10,079,130 B2
(45) Date of Patent: Sep. 18, 2018

(54) CIRCUIT BREAKER

(71) Applicant: LSIS CO., LTD., Gyeonggi-do (KR)

(72) Inventor: Il-Hyun Kim, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/601,023

(22) Filed: May 22, 2017

(65) Prior Publication Data

US 2017/0338070 A1   Nov. 23, 2017

(30) Foreign Application Priority Data

May 23, 2016   (KR) .................. 10-2016-0062579

(51) Int. Cl.
   *H01H 71/02*   (2006.01)
   *H01H 71/08*   (2006.01)
   (Continued)

(52) U.S. Cl.
   CPC .......... *H01H 71/0264* (2013.01); *H01H 1/58* (2013.01); *H01H 33/6606* (2013.01); *H01H 71/08* (2013.01); *H01H 71/522* (2013.01); *H02B 11/04* (2013.01); *H01H 9/24* (2013.01); *H02B 11/133* (2013.01)

(58) Field of Classification Search
   CPC .. H01H 1/06; H01H 9/38; H01H 1/18; H01H 1/26; H01H 1/42; H01H 1/58; H01R 13/112; H01R 13/113; H01R 13/11
   USPC ........ 200/275, 239, 241, 242; 439/856, 857, 439/849, 850
   See application file for complete search history.

(56) References Cited

U.S. PATENT DOCUMENTS 4,505,531 A * 3/1985 Miller .................. H01R 13/187
                                                  439/246
4,877,409 A   10/1989 Tanigawa et al.
(Continued)

FOREIGN PATENT DOCUMENTS

CN   201219183 Y   4/2009
DE    1790182 A1   1/1972
(Continued)

OTHER PUBLICATIONS

Korean Office Action dated May 30, 2017 in connection with the corresponding Korean Patent Application No. 10-2016-0062579.
(Continued)

*Primary Examiner* — Gary Paumen
(74) *Attorney, Agent, or Firm* — K&L Gates LLP

(57) ABSTRACT

A circuit breaker is provided, which includes a cradle having a plurality of cradle terminals, and a breaker main body connected to the cradle and having a plurality of breaker terminals electrically connected to the plurality of cradle terminals, in which each of the plurality of breaker terminals includes a terminal body extended from the breaker main body and protruded toward each of the plurality of cradle terminals, contacts coupled to upper and lower portions of terminal body and disposed in parallel to face each other, and a contact protrusion protruded to a round shape in a direction which the contacts face each other such that, upon connection of the plurality of cradle terminals, the contact protrusion contacts and presses both sides of the connected cradle terminals.

6 Claims, 16 Drawing Sheets

(51) Int. Cl.
*H01H 71/52* (2006.01)
*H01H 1/58* (2006.01)
*H01H 33/66* (2006.01)
*H02B 11/04* (2006.01)
*H01H 9/24* (2006.01)
*H02B 11/133* (2006.01)

(56) References Cited

U.S. PATENT DOCUMENTS

| | | | | |
|---|---|---|---|---|
| 5,147,230 A | * | 9/1992 | Plyler | H01R 13/187 439/843 |
| 5,554,056 A | * | 9/1996 | Henricus op ten Berg | H01R 13/112 439/851 |
| 5,562,501 A | * | 10/1996 | Kinoshita | H01R 13/113 439/851 |
| 5,685,726 A | * | 11/1997 | Lwee | H01R 12/716 439/554 |
| 6,102,754 A | * | 8/2000 | Capper | H01R 13/113 439/517 |
| 6,116,970 A | * | 9/2000 | Yamamoto | H01R 13/113 439/852 |
| 6,478,636 B1 | * | 11/2002 | Makita | H01R 13/113 439/852 |
| 6,595,799 B2 | | 7/2003 | Yao | H01R 24/44 439/578 |
| 6,595,810 B1 | * | 7/2003 | Kenny | H01R 13/6395 439/106 |
| 8,323,061 B2 | * | 12/2012 | Hori | H01R 13/114 439/852 |
| 8,371,883 B2 | * | 2/2013 | Kimura | H01R 13/113 439/852 |
| 8,647,160 B2 | * | 2/2014 | Umemoto | H01R 13/113 439/845 |
| 8,858,269 B2 | | 10/2014 | Brand et al. | |
| 9,196,985 B2 | | 11/2015 | Miller et al. | |
| 9,336,977 B1 | | 5/2016 | Bogdon et al. | |
| 2005/0164567 A1 | * | 7/2005 | Sawada | H01R 43/16 439/856 |
| 2006/0223385 A1 | * | 10/2006 | Pavlovic | H01R 13/113 439/858 |
| 2007/0111614 A1 | * | 5/2007 | Tanaka | H01R 13/113 439/852 |
| 2009/0029605 A1 | * | 1/2009 | Matsumoto | H01R 13/113 439/843 |
| 2015/0087192 A1 | * | 3/2015 | Tanigawa | H01R 13/187 439/852 |

FOREIGN PATENT DOCUMENTS

| | | |
|---|---|---|
| EP | 2690637 A1 | 1/2014 |
| KR | 10-0868567 B1 | 11/2008 |
| KR | 10-2010-0102488 A | 9/2010 |
| KR | 10-2011-0074636 A | 7/2011 |
| KR | 10-1106899 B1 | 1/2012 |
| KR | 10-2013-0074324 A | 7/2013 |

OTHER PUBLICATIONS

European Search Report for related European Application No. 17170853.0; report dated Feb. 2, 2018; (8 pages).

Chinese Office Action for related Chinese Application No. 201710357499.7; action dated Jul. 24, 2018; (7 pages).

* cited by examiner (PRIOR ART)

(PRIOR ART)

(PRIOR ART)

(PRIOR ART)

(PRIOR ART)

(PRIOR ART)

(PRIOR ART)

(PRIOR ART)

CIRCUIT BREAKER

TECHNICAL FIELD

The present application claims priority to Korean Patent Application No. 10-2016-0062579 filed on May 23, 2016 in the Republic of Korea, the disclosures of which are incorporated herein by reference.

The present disclosure relates to a circuit breaker, and more particularly, to a circuit breaker capable of smoothly connecting between breaker terminals of a breaker main body and cradle terminals of a cradle and maintaining a constant contact state therebetween, regardless of an arrangement structure of the circuit breaker.

BACKGROUND ART

A circuit breaker is a device that protects the circuit by stopping the current when a current exceeding a specified value flows through the circuit, and used for opening and closing the normal load of the circuit and cutting off the fault current.

For example, the circuit breaker can be used in a switchboard that includes various electric devices including the breaker to operate or control a power plant, a substation, and so on, or operate a motor.

FIG. 1 is a perspective view schematically illustrating a breaker main body.

Referring to FIG. 1, the breaker main body 1 has a plurality of breaker terminals 10 (e.g., 10a, 10b).

In an example, an upper terminal 10a of a plurality of breaker terminals is a bus terminal, and a lower terminal 10b is a load terminal.

Meanwhile, FIG. 2 is a schematic view of a cradle to which a breaker main body is connected.

Referring to FIG. 2, the cradle 3 for connection with the breaker main body 1 (see FIG. 1) described above is shown, in which the cradle 3 is provided with a plurality of cradle terminals 20 (e.g., 20a, 20b).

In an example, an upper terminal 20a is a bus cradle terminal and a lower terminal 20b is a load cradle terminal.

As described above, a plurality of breaker terminals 10 (e.g., 10a, 10b) (see FIG. 1) are connected to a plurality of cradle terminals 20 (e.g., 20a, 20b).

Accordingly, the circuit breaker is configured, including therein the breaker main body 1 having a plurality of breaker terminals 10 (e.g., 10a, 10b) and the cradle 3 having a plurality of cradle terminals 20 (e.g., 20a, 20b).

FIGS. 3 and 4 are side views illustrating a relationship between the breaker main body and the cradle before and after the breaker main body is connected to the cradle. Referring to FIG. 3 illustrating the breaker main body 1 before being connected to the cradle 3, the breaker main body 1 is configured to be movable toward the cradle 3 fixed in position.

In an example, the bus cradle terminal 20a of the cradle 3 is formed in the same position as the bus breaker terminal 10a of the breaker main body 1, and the load cradle terminal 20b of the cradle 3 is formed in the same position as the load breaker terminal 10b of the breaker main body 1.

FIG. 4 illustrates the breaker main body 1 moving in an insert direction W to be connected to the cradle 3.

That is, FIG. 4 shows a plurality of breaker terminals 10 (e.g., 10a, 10b) provided in the breaker main body 1 being connected to a plurality of cradle terminals 20 (e.g., 20a, 20b) provided in the cradle 3.

FIG. 5 is a view illustrating, in enlargement, a detailed configuration of a related terminal.

Referring to FIG. 5, the related breaker terminal 10 (including the bus breaker terminal 10a and the load breaker terminal 10b) includes a terminal body 11, and contacts 13 coupled to upper and lower portions of the terminal body 11.

The related breaker terminal 10 includes the contacts 13 connectible to cradle terminals (that is, to any of 20a and 20b in FIG. 4).

In particular, a pin fixing member 17 is simultaneously fastened through the terminal body 11 and the contact 13 to fix the contact 13.

Further, a contact spring 15 is provided between the contact 13 on one side (e.g., upper side) and a head of the pin fixing member 17 to impart a predetermined elastic force.

FIGS. 6A. 6B and 6C are views illustrating a related terminal moving in a direction toward the cradle terminal for connection.

Referring to FIG. 6A, the breaker terminal 10 of the breaker main body is moved toward the cradle terminal 20 of the cradle.

In an example, the breaker terminal includes a bus breaker terminal 10a and a load breaker terminal 10b, and the cradle terminal 20 includes a bus cradle terminal 20a and a load cradle terminal 20b.

Meanwhile, curved surface portions 14 are provided at front end portions of the related contacts 13 such that an insert part 21 of the cradle terminal 20 is moved along the curved surface portions 14 to be smoothly inserted into a gap defined between the contacts 13.

That is, interferences and impacts are not suffered when the cradle terminal 20 is inserted in between the contacts 13.

Referring to FIGS. 6B and 6C, the insert part 21 of the cradle terminal 20 is inserted by a predetermined length along the curved surface portions 14 of the contacts 13.

Then, the curved surface portions 14 press both sides of the inserted cradle terminal 20 to securely maintain the contact state therebetween.

To that end, the gap between the curved surface portions 14 of the contacts 13 is formed smaller than the thickness of the cradle terminal 20.

Meanwhile, as illustrated in FIGS. 6A to 6C, the circuit breaker may be provided in a transversal arrangement of the circuit breaker, in which the breaker terminal 10 of the breaker main body and the cradle terminal 20 of the cradle are connected to each other in a mutually facing manner. Alternatively, a longitudinal arrangement of the circuit breaker may be contemplated.

FIG. 7 illustrates a longitudinal arrangement of the circuit breaker.

Referring to FIG. 7, a plurality of breaker terminals 10 are arranged in a straight line at equal gap on the breaker main body 1, and cradle terminals 20 disposed in front of each breaker terminal 10 are connected thereto.

Thus, in this arrangement, the respective cradle terminals 20 are connected to the respective breaker terminals 10 upon the breaker main body 1 being moved in the insert direction W.

Meanwhile, referring to the encircled section of FIG. 8 shown in enlargement, the structure of the curved surface portions 14 of the related contact 13 causes a problem in which the cradle terminal 20 cannot pass through the side surfaces of the curved surface portions 14 and the curved surface portion 14 and the cradle terminal 20 collide against each other at certain region P.

In other words, a gap c (see FIG. 9) between the curved surface portions 14 of the related contacts 13 is formed narrower than the thickness t (see FIG. 8) of the cradle terminal 20.

Therefore, in the transversal arrangement of the circuit breaker, insertion of the cradle terminal can be facilitated, using a certain shape of the curved surface portions 14.

However, as shown in FIG. 8, since the cradle terminal 20 cannot be fit into the curved surface portions 14 having the gap c (see FIG. 9) narrower than the thickness t of the cradle terminal 20, the longitudinal arrangement of the circuit breaker particularly has a problem in connecting the breaker terminals 10 and the cradle terminals 20.

For related technology of the present disclosure, Korean Patent No. 10-1309040 discloses a circuit breaker.

SUMMARY

It is an object of the present disclosure to provide a circuit breaker capable of smoothly connecting between breaker terminals of a breaker main body and cradle terminals of a cradle and maintaining a constant contact state therebetween, regardless of an arrangement structure of the circuit breaker.

The objectives that are intended to be addressed by the present disclosure are not limited to that mentioned above, and other objectives that are not mentioned above can be clearly understood to those skilled in the art based on the description provided below.

According to an embodiment of the present disclosure, a circuit breaker is provided, which may include a cradle having a plurality of cradle terminals, and a breaker main body connected to the cradle and having a plurality of breaker terminals electrically connected to the plurality of cradle terminals, in which each of the plurality of breaker terminals includes a terminal body extended from the breaker main body and protruded toward each of the plurality of cradle terminals, contacts coupled to upper and lower portions of terminal body and disposed in parallel to face each other, and a contact protrusion protruded to a round shape in a direction in which the contacts face each other such that, upon connection of the plurality of cradle terminals, the contact protrusion contacts and presses both sides of the connected cradle terminals.

In an example, a plurality of contact protrusions may be provided for each of the contacts.

Further, the contact protrusions may be disposed close to front end portions of the contacts.

Further, the contact protrusions may have a hemispherical shape.

Further, the contact protrusions may be formed such that height thereof gradually increases along a direction toward rear ends of the contacts.

Further, the contact protrusion may have an inclined surface such that a degree of protrusion is gradually increased along a direction toward the rear ends of the contacts to limit insertion of the connected terminal.

Also, the contact protrusions may have one of a round shape extended along a longitudinal direction of the contacts, a round shape extended along a width direction of the contacts, and a round shape extended respectively along the length and the width directions of the contacts.

The present disclosure gives the following effects. According to the present disclosure, a smooth connection between the breaker terminals of the breaker main body and the cradle terminals of the cradle is enabled regardless of an arrangement structure of the circuit breaker, i.e., regardless of whether the circuit breaker is in a longitudinal arrangement or a transversal arrangement, for example.

Further, when the breaker terminals of the breaker main body and the cradle terminals of the cradle are connected, collisions against each other can be prevented, and thus breakage of parts can be suppressed and durability of the device can be improved.

Further, once the breaker terminal of the breaker main body and the cradle terminal of the cradle are connected, the connection state is constantly maintained. Accordingly, the operation reliability and stability can be ensured.

DESCRIPTION OF DRAWINGS

The above and/or other aspects of the present inventive concept will be more apparent by describing certain exemplary embodiments of the present inventive concept with reference to the accompanying drawings, in which.

DETAILED DESCRIPTION

Hereinafter, a specific embodiment to implement the idea of the present disclosure will be described in detail with reference to the drawings.

In the following description of the present disclosure, a detailed description of known configurations and functions incorporated herein will be omitted when it may make the subject matter of the present disclosure rather unclear.

A circuit breaker is a device that protects the circuit by stopping the current when a current exceeding a specified value flows through the circuit, and used for opening and closing the normal load of the circuit and cutting off the fault current.

For example, the circuit breaker can be used in a switchboard that includes various electric devices including the breaker to operate or control a power plant, a substation, and so on, or operate a motor.

A circuit breaker according to an embodiment of the present disclosure includes a cradle (see FIG. 2) having a plurality of cradle terminals 20 (e.g., 20a, 20b) (see FIG. 2), and a breaker main body 1 (see FIG. 1) having a plurality of breaker terminals 10 (e.g., 10a, 10b) (see FIG. 1) connected to the plurality of cradle terminals.

Figure 10:
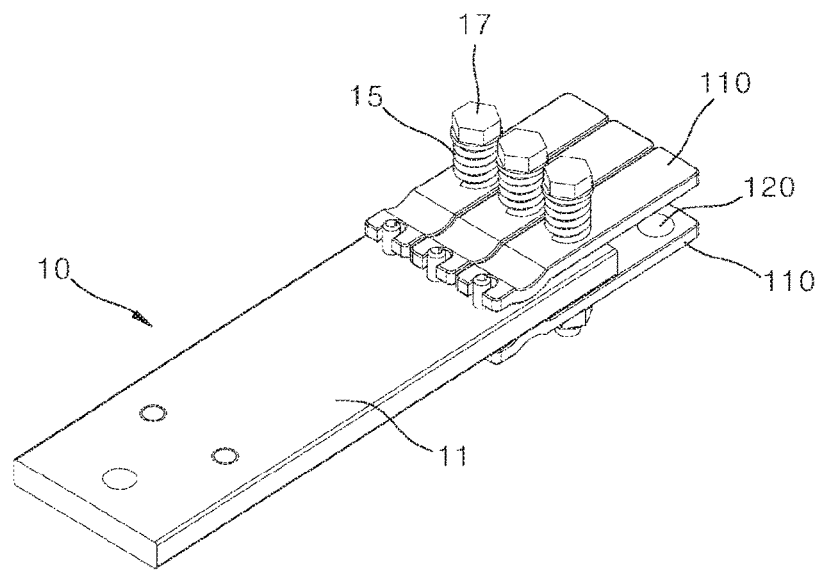
FIG. 10 is a perspective view illustrating a breaker terminal of a circuit breaker according to an embodiment of the present disclosure.

In an example, each of the plurality of breaker terminals ay include a contact 110 and a contact protrusion 120 as shown in FIG. 10.

Figure 1:
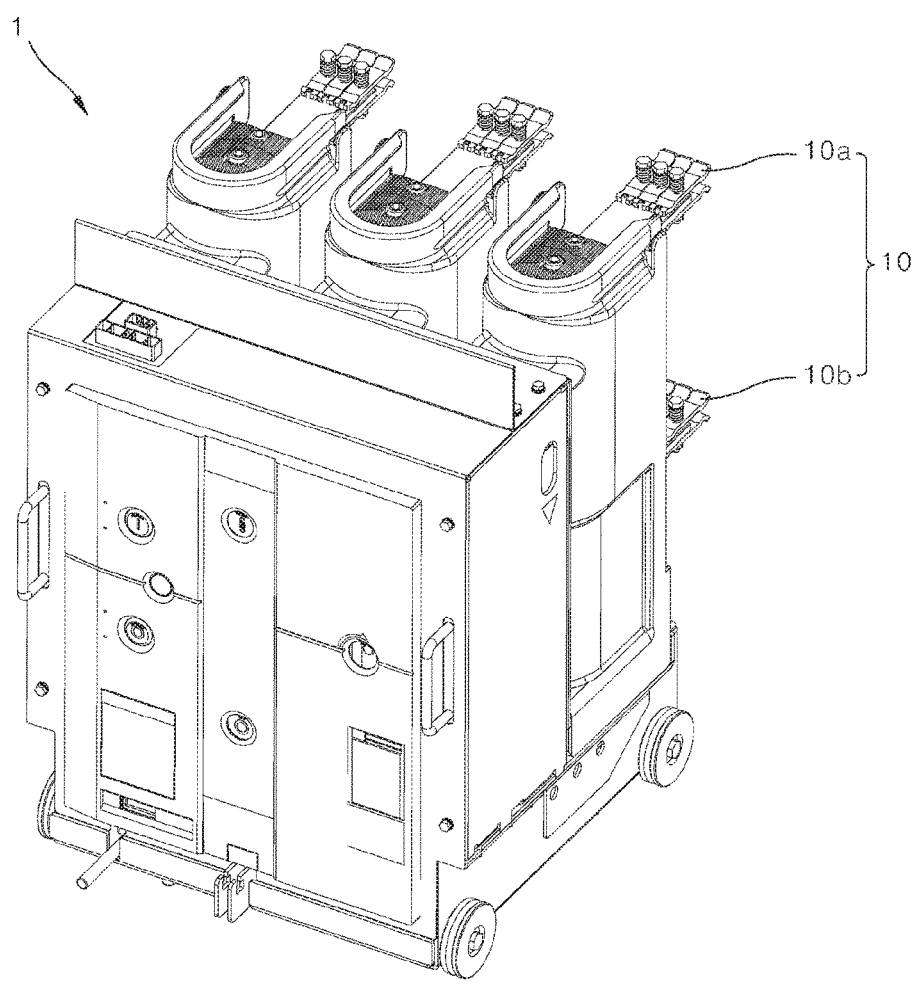
FIG. 1 is a perspective view schematically illustrating a breaker main body.

The breaker main body 1 (see FIG. 1) may have a plurality of breaker terminals 10 (e.g., 10a, 10b) (see FIG. 1).

In a preferred example, referring to FIG. 1, the upper breaker terminal 10a may be a bus breaker terminal and the lower breaker terminal 10b may be a load breaker terminal.

The breaker main body 1 (see FIG. 1) is connected to the cradle 3 (see FIG. 2) which may be provided with a plurality of cradle terminals 20 (e.g., 20a, 20b) (see FIG. 2) corresponding to the plurality of breaker terminals 10 (e.g., 10a, 10b) (see FIG. 1).

Figure 2:
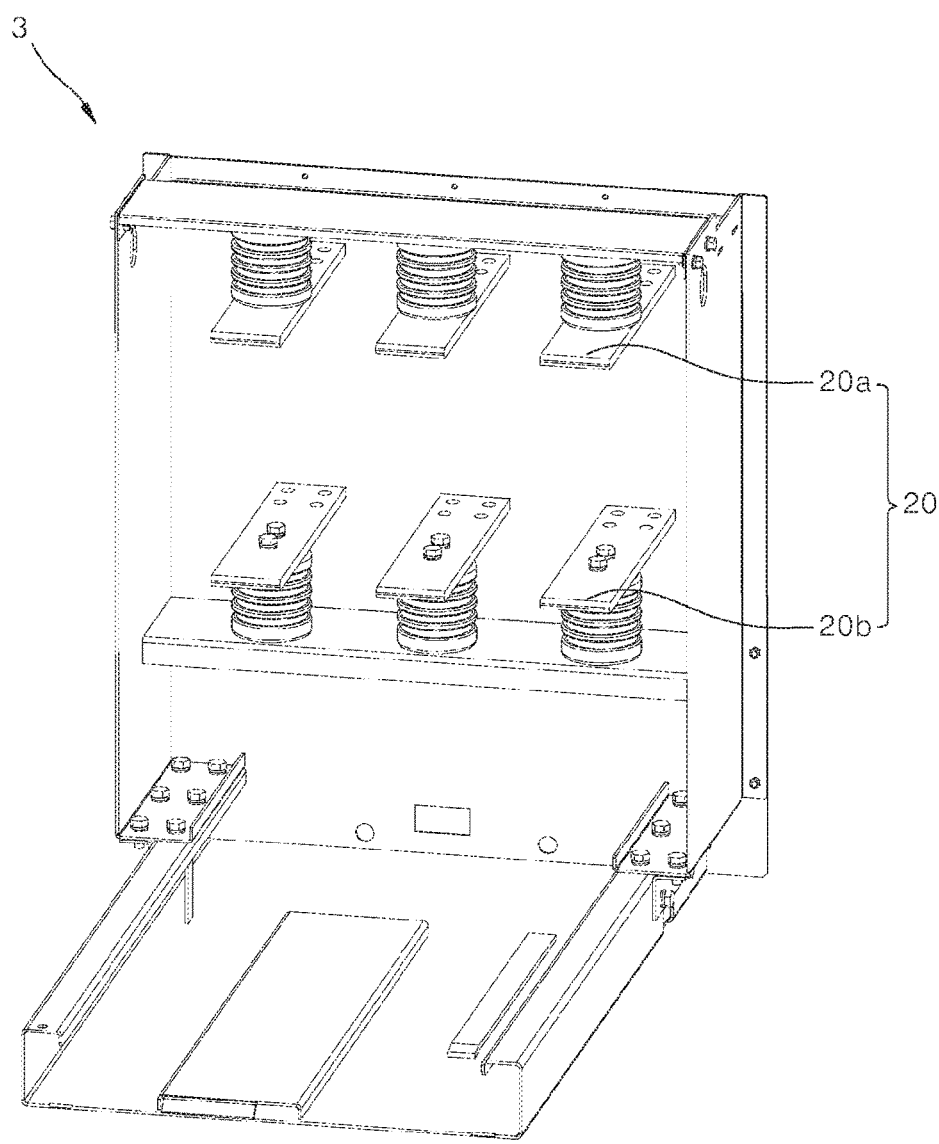
FIG. 2 is a schematic view of a cradle to which a breaker main body is connected.
Figure 3:
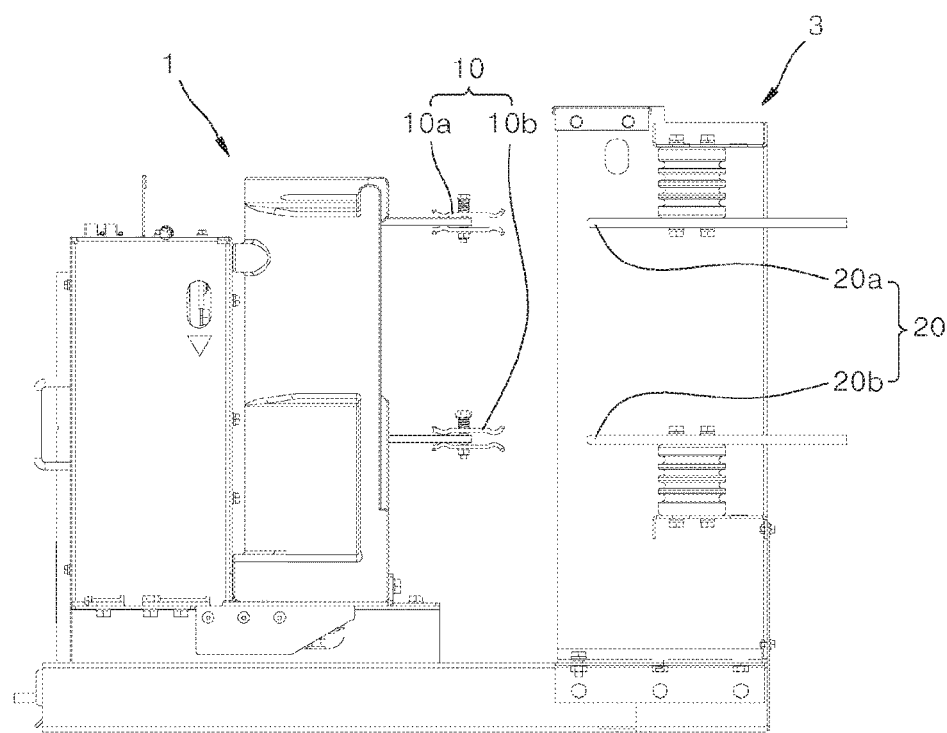
FIGS. 3 and 4 are side views illustrating a relationship between the breaker main body and the cradle before and after the breaker main body is connected to the cradle.
Figure 4:
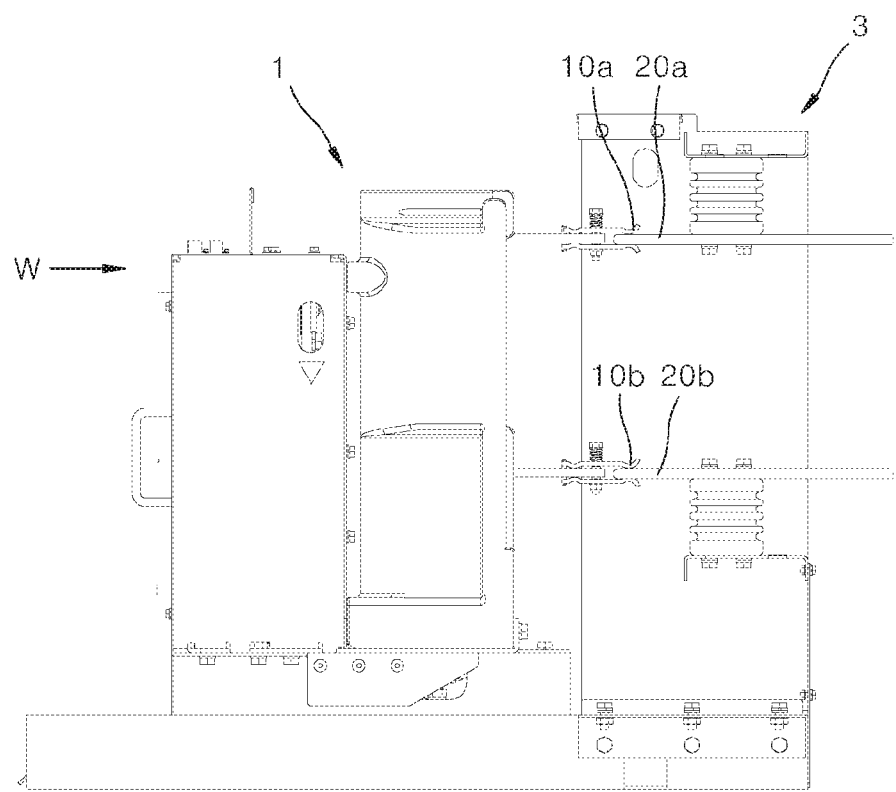
Figure 5:
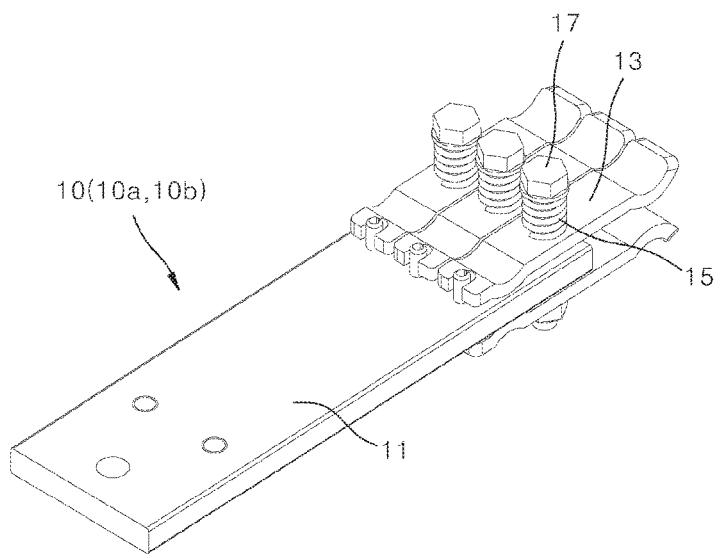
FIG. 5 is a view illustrating, in enlargement, a detailed configuration of a related terminal.
Figure 6A:
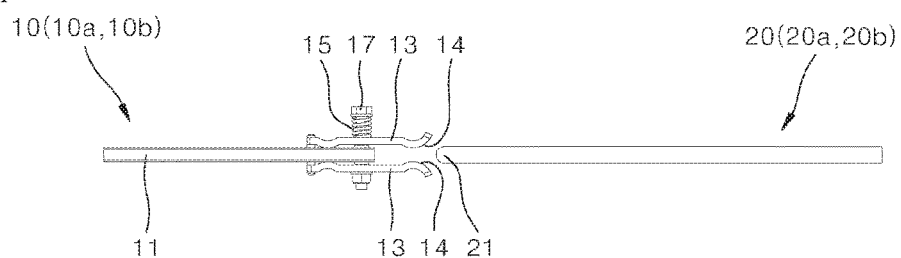
FIGS. 6A, 6B and 6C are views illustrating a related breaker terminal moving in a direction toward the cradle terminal for connection.
Figure 6B:
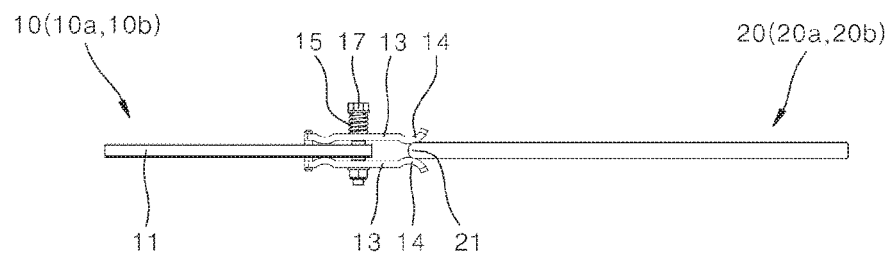
Figure 6C:
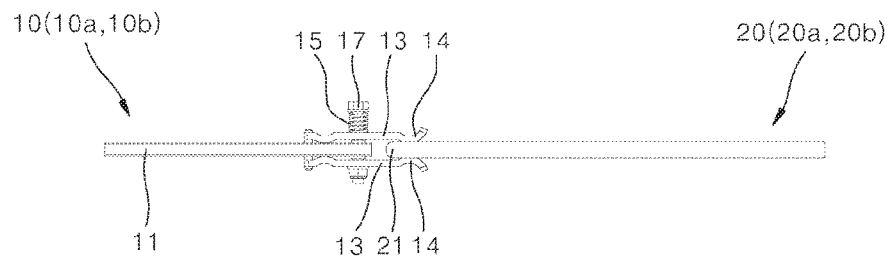
Figure 7:
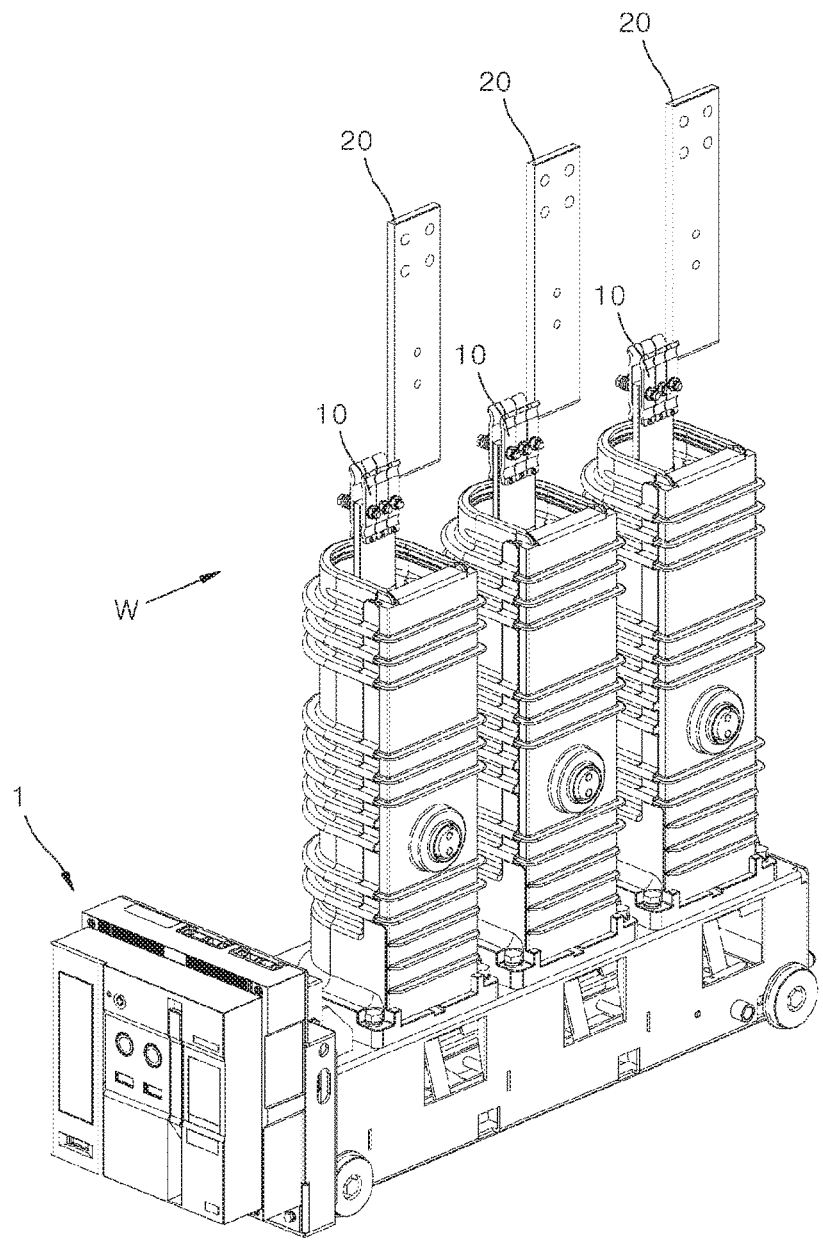
FIGS. 7 and 8 are views illustrating a longitudinal arrangement of a circuit breaker.
Figure 8:
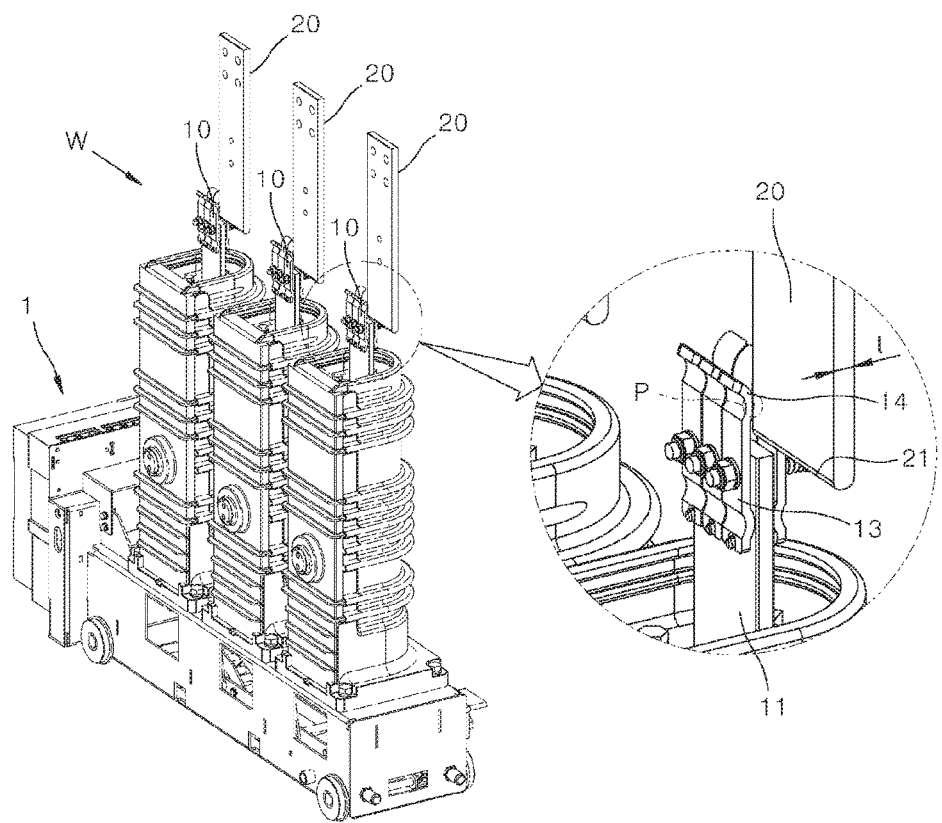
Figure 9:
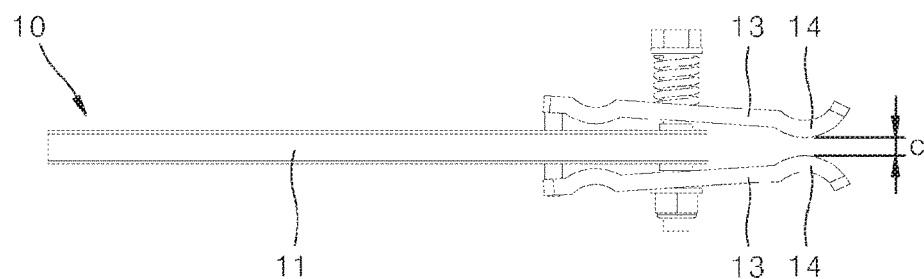
FIG. 9 is a view illustrating a gap between curved surface portions of related contacts.

Referring to FIG. 2, in a preferred example, the upper cradle terminal 20a (see FIG. 2) may be a bus cradle terminal for connecting to the bus breaker terminal, and the lower cradle terminal 20b (see FIG. 2) may be a load cradle terminal for connecting to the load breaker terminal.

As described above, a plurality of cradle terminals 20 (e.g., 20a, 20b) (see FIG. 2) provided in the cradle 2 (see FIG. 2) are connected to a plurality of breaker terminals 10 (10a, 10b) (see FIG. 1) provided in the breaker main body 1 (see FIG. 1).

A terminal according to an embodiment of the present disclosure is shown in FIG. 10.

Referring to FIG. 10, the illustrated breaker terminal 10 has a terminal body 11 preferably in a form of a long rectangular plate, but not limited thereto.

The contacts 110 may be coupled to upper and lower portions of the terminal body 11 through front portion (that is, 'front end') of the terminal body 11, and may be arranged in parallel, while facing each other, with a gap defined therebetween, in which the gap is wider than the thickness of each of the plurality of cradle terminals described above.

Figure 11:
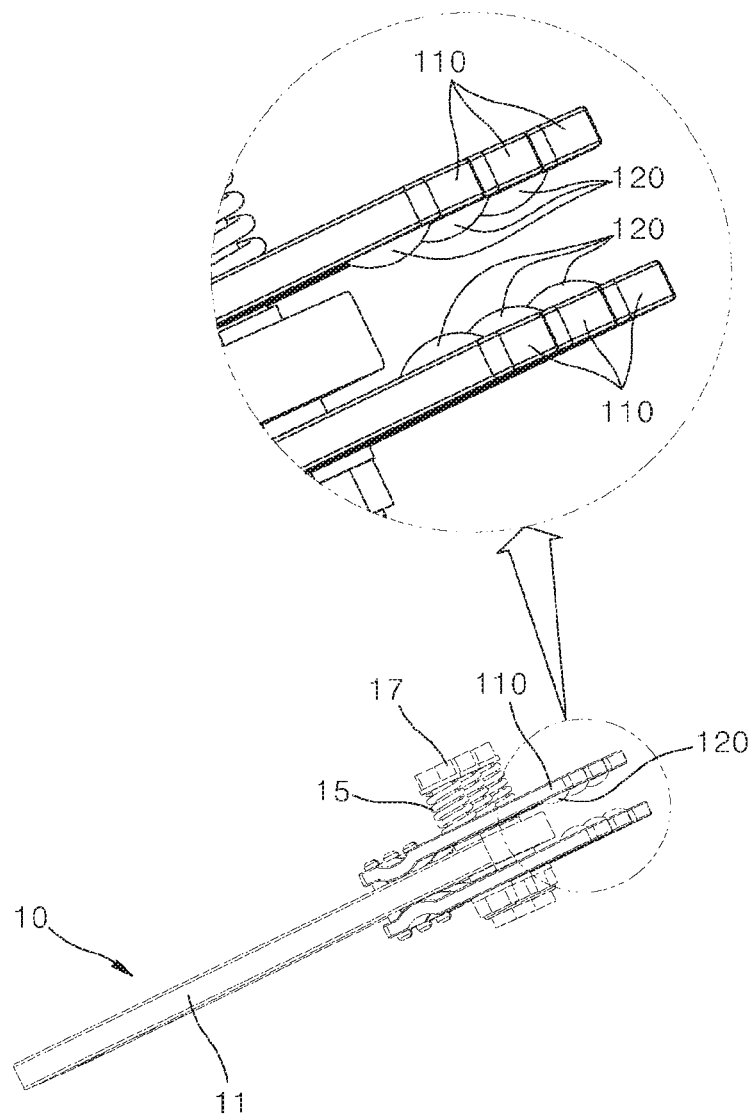
FIG. 11 is an enlarged perspective view a contact and a contact protrusion according to an embodiment of the present disclosure.

In a specific example, as illustrated in FIG. 11, the contact 110 is divided into six pieces, of which three pieces are coupled to one surface of terminal body 11, and the remaining three pieces are coupled to the other surface of the terminal body 11.

In an example, the remaining three contacts 110 coupled to the other surface may be arranged to face the three contacts 110 coupled to one surface in parallel relation.

On the other hand, such contacts 110 may be fixed to the terminal body 11 by the pin fixing member 17.

A contact spring 15 may be provided between the three contacts 110 coupled to one surface and the head of the pin fixing member 17 to impart a predetermined elastic force to the contacts 110.

Figure 12:
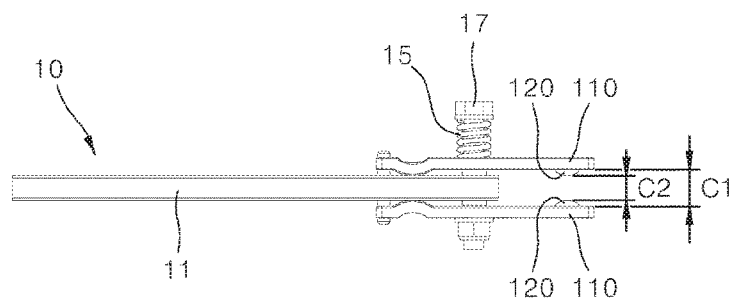
FIG. 12 is a cross-sectional view illustrating a terminal of a circuit breaker according to an embodiment of the present disclosure.

Further, a gap C1 (see FIG. 12) of a predetermined size may be formed between the contacts 110 coupled through one side and the other side of the terminal body 11 to face each other, and this will be referred to as a 'first gap C1' (see FIG. 12).

The first gap C1 (see FIG. 12) may be necessarily formed wider than the thickness t (see FIG. 13) of the cradle terminal 20 (see FIG. 13) of the cradle.

The contact protrusion 120 may be protruded in a round shape between the facing contacts 110, i.e., protruded in between the contacts 110 which are coupled to one and the other surfaces of the terminal body 11 and facing each other, as shown in FIG. 11.

Preferably, as can be seen from FIG. 11, one contact protrusion 120 may protrude for six contacts 110.

This contact protrusion 120 presses both sides of the cradle terminal 20 (see FIG. 13) of the cradle to maintain the cradle in a contacted state once the cradle is advanced through the first gap C1 (see FIG. 12) between the contacts 110.

Accordingly, a relatively narrower gap C2 (hereinafter, 'second gap') (see FIG. 12) than the thickness t of the cradle terminal 20 (see FIG. 13) may be formed between the contact protrusions 120.

FIG. 12 is a cross-sectional view illustrating a breaker terminal of a circuit breaker according to an embodiment of the present disclosure.

Referring to a cross-sectional view of FIG. 12, the contacts 110 facing each other are coupled to upper and lower portions of the terminal body 11, and the contact protrusions 120 are protruded in a round shape in the direction between the contacts 110 face each other, i.e., in the direction between the opposing contacts 110.

Figure 13:
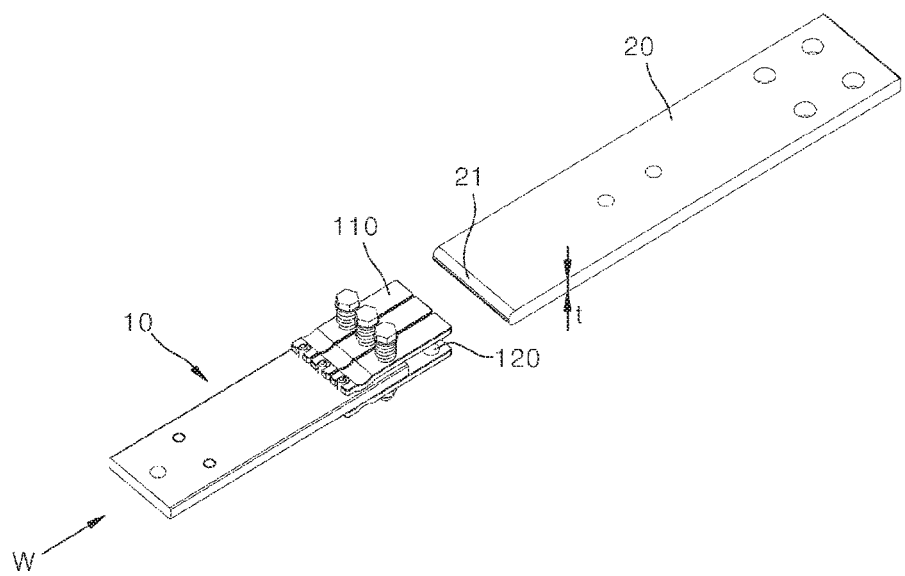
FIG. 13 is a perspective view illustrating a breaker terminal and a cradle terminal according to a transversal arrangement structure of the circuit breaker before connection.

In particular, the first gap C1 formed between the contacts 110 is formed relatively wider than the thickness t of the cradle terminal (see FIG. 13).

The second gap C2 formed between the contact protrusions 120 may be formed relatively narrower than the thickness t of the cradle terminal (see FIG. 13).

According to this structural feature, it is possible to smoothly connect the breaker terminals of the breaker main body and the cradle terminals of the cradle regardless of the arrangement structure of the circuit breaker.

FIG. 13 is a perspective view illustrating a breaker terminal and a cradle terminal according to a transversal arrangement structure of the circuit breaker before connection.

Referring to FIG. 13, the breaker terminal 10 and the cradle terminal 20 according to the transversal arrangement structure f the circuit breaker before being connected to each other are shown.

When the breaker main body is moved in the insert direction W, the breaker terminals 10 facing the cradle terminals 20 are moved toward the cradle terminals 20 so that the terminals are connected with each other.

Figure 14A:
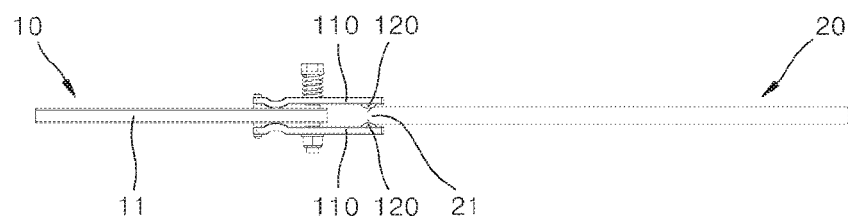
FIGS. 14A and 14B are cross-sectional views illustrating a breaker terminal and a cradle terminal according to a transversal arrangement structure of a circuit breaker after connection.
Figure 14B:
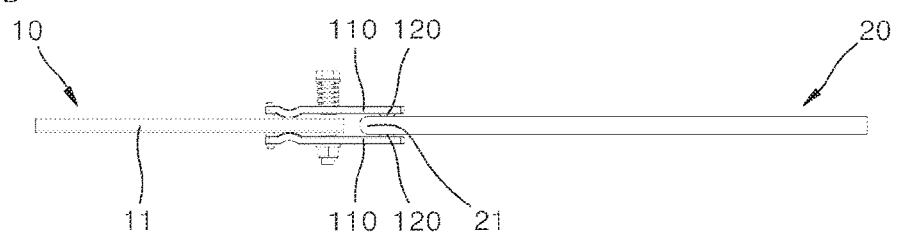

FIGS. 14A and 14B are cross-sectional views illustrating a breaker terminal and a cradle terminal according to a transversal arrangement structure of a circuit breaker after connection.

Referring to FIG. 14A, the cradle terminals 20, and particularly the insert parts 21 of the cradle terminals, can smoothly pass through the first gap C1 (see FIG. 12) between the contacts 110.

The cradle terminals 20 then reach the contact protrusions 120 protruded in the direction between the opposing contacts 110.

Referring to FIG. 14B, the insert part 21 of the terminal may slightly lift the round-shaped contact protrusions 120 and contacted with the contact protrusion 120 and fixed in place.

As a result, the constant contact state between the cradle terminal 20 and the breaker terminal 10 can be maintained.

Figure 15:
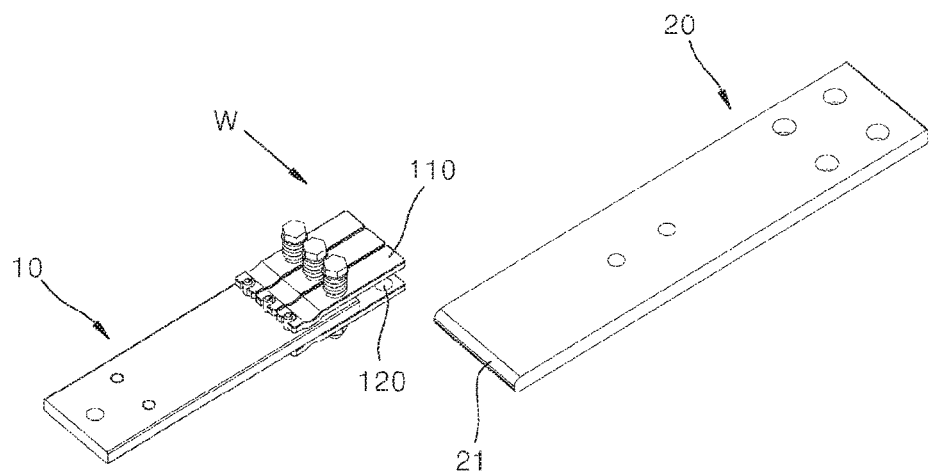
FIG. 15 is a perspective view illustrating a breaker terminal and a cradle terminal according to a longitudinal arrangement structure of the circuit breaker before connection.

FIG. 15 is a perspective view illustrating a breaker terminal and a cradle terminal according to a longitudinal arrangement structure of the circuit breaker before connection.

Referring to FIG. 15, the breaker terminal 10 and the cradle terminal 20 according to the longitudinal arrangement structure of the circuit breaker before being connected to each other are shown.

The breaker terminal 10 may be moved in the insert direction W as shown, passed in a side direction of the cradle terminal 20 placed on one side and then connected.

Figure 16A:
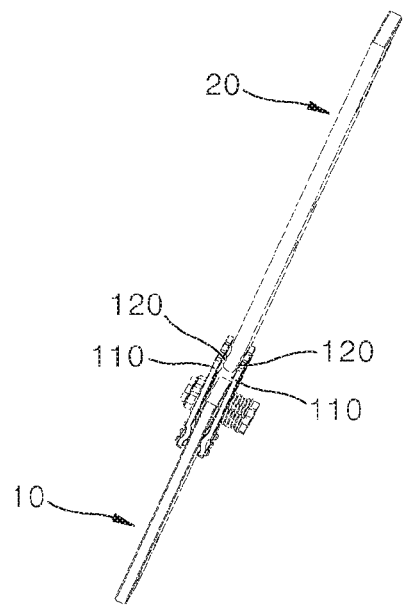
FIGS. 16A and 16B are cross-sectional views illustrating a breaker terminal and a cradle terminal according to a longitudinal arrangement structure of a circuit breaker after connection.
Figure 16B:
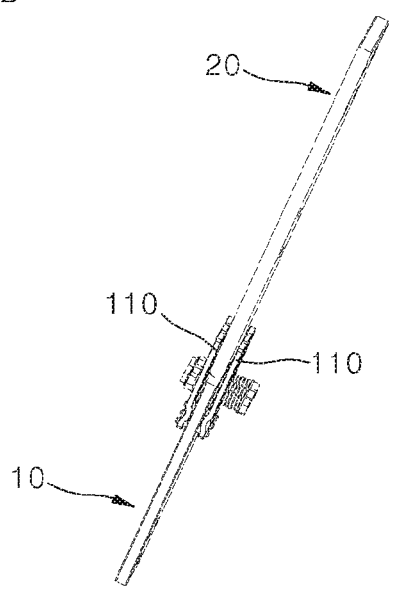

FIGS. 16A and 16B are cross-sectional views illustrating a breaker terminal and a cradle terminal according to a longitudinal arrangement structure of a circuit breaker after connection.

Referring to FIG. 16A, the cradle terminal 20 may smoothly pass the first gap C1 (see FIG. 12) between the contacts 110 formed wider than their own thickness in a side direction, without experiencing collision or impact.

The cradle terminals 20 then reach the contact protrusion 120 protruded in the direction between the opposing contacts 110.

Referring to FIG. 16B, the cradle terminal 20 slightly lifts the contact protrusion 120 having a round shape and then caught in the contact protrusion 120 so that the contact state is maintained.

According to the method described above, connection between the cradle terminal 20 and the breaker terminal 10 may be smoothly performed even when the circuit breaker has the longitudinal arrangement structure.

If possible, the contact protrusion 120 may preferably be disposed close to the front end of the contact 110, although not necessarily limited thereto.

In addition, while the drawing illustrates only one contact protrusion 120, it is not limited thereto. Accordingly, one or more contact protrusions 120 may be formed.

The contact protrusion 120 according to the embodiment of the present disclosure may have a hemispherical shape as shown in FIG. 11, but not limited thereto.

FIGS. 17A, 17B and 18A and 18B are top views and cross-sectional views illustrating other embodiments of the contact protrusion according to the present disclosure.

Figure 17A:
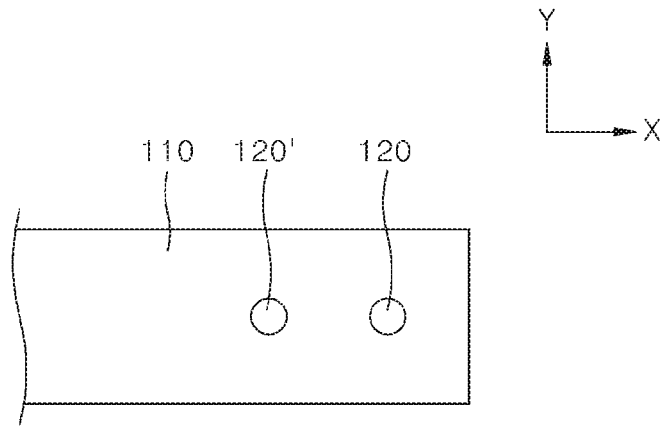
FIGS. 17A and 17B are a top view and a cross-sectional illustrating a contact protrusion according to another embodiment of the present disclosure.
Figure 17B:
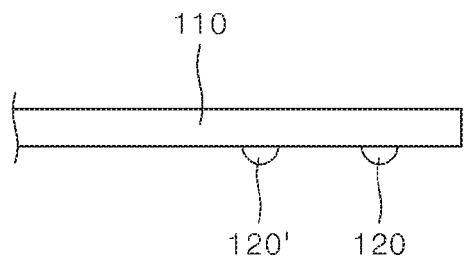

Referring to FIGS. 17A and 17B, according to the illustrated embodiment, a plurality of contact protrusions 120 and 120' (e.g., two contact protrusions, etc.) may be provided in one contact 110.

Referring to FIG. 17A, two contact protrusions 120 and 120' may be provided in a straight line along a longitudinal direction (that is, X-axis direction) of the contact 110.

The cross section of each of the contact protrusion 120, 120' may have a hemispherical shape as shown in FIG. 17B.

Meanwhile, although not shown separately, a plurality of contact protrusion 120 and 120' may be provided in parallel along a width direction Y-axis direction) of the contact 110.

Figure 18A:
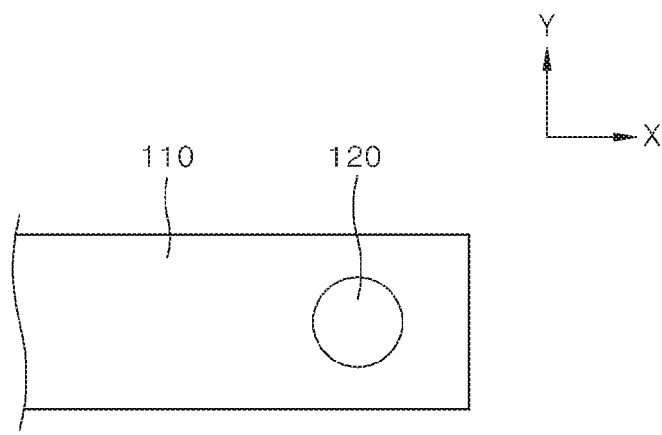
FIGS. 18A and 18B are a top view and a cross-sectional view illustrating a contact protrusion according to another embodiment of the present disclosure.
Figure 18B:
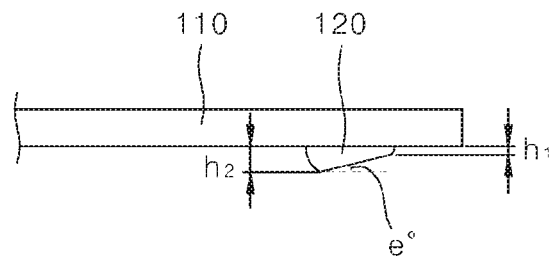

Referring to FIGS. 18A and 18B, according to the illustrated embodiment, a single contact protrusion 120 is provided in the contact 110. The contact protrusion 120 may be formed such that a height h2 at the rear end direction (i.e., inward direction) of the contact 110 is greater than the height hi at the outward direction of the contact protrusion 120.

As a specific example, as shown in FIG. 18B, the contact protrusion 120 according to the illustrated embodiment has a hemispherical shape.

In addition, the contact protrusion 120 may have an inclined surface such that the degree of protrusion is gradually increased toward the rear end of the contact 110 to limit a distance of insertion by the cradle terminal 20 (see FIG. 13) connected among the contacts 110.

In other words, the contact protrusion 120 of the hemispherical shape may have a higher inner height h2 an the outer height h1.

An inclined surface is formed at a predetermined slope e so as to restrict the insertion of the cradle terminals 20 (see FIG. 13).

Next, various modified examples of the contact protrusion 110 will be described.

Figure 19A:
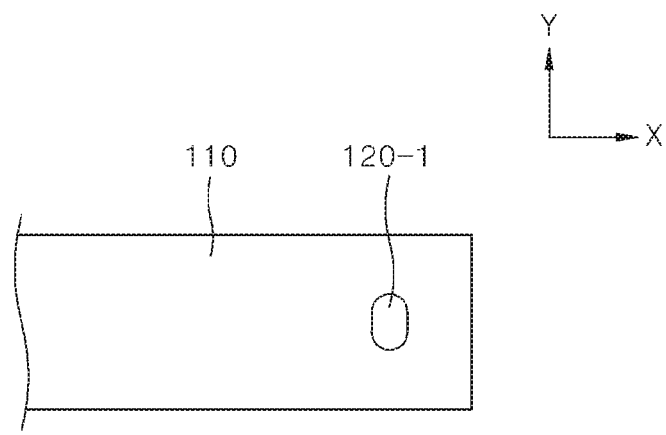
FIGS. 19A and 19B are a top view and a cross-sectional view illustrating a contact protrusion according to a first modified example of the present disclosure.
Figure 19B:
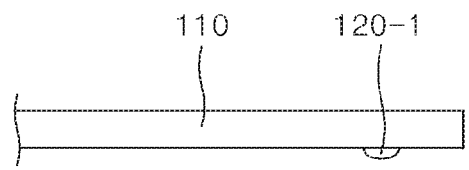

FIGS. 19A and 19B are a top view and a cross-sectional view illustrating a contact protrusion according to a first modified example of the present disclosure.

Referring to FIGS. 19A and 19B, the contact protrusion 120-1 formed at a center region of the front end of the contact 110 according to a first modified example is shown in top view and cross-sectional view.

Referring to FIG. 19A, the illustrated contact protrusion 120-1 may have a round shape elongated along the width direction (i.e., Y-axis direction) of the contact 110, rather than having the hemispherical shape described above.

Referring to FIG. 199, the contact protrusion 120-1 may be convexly protruded to a dome shape so as to further secure the contact state between the cradle terminals and the breaker terminals, irrespective of whether the cradle terminals 20 (see FIG. 16A) are connected in the X-axis direction or the Y-axis direction (see FIG. 19A).

Figure 20A:
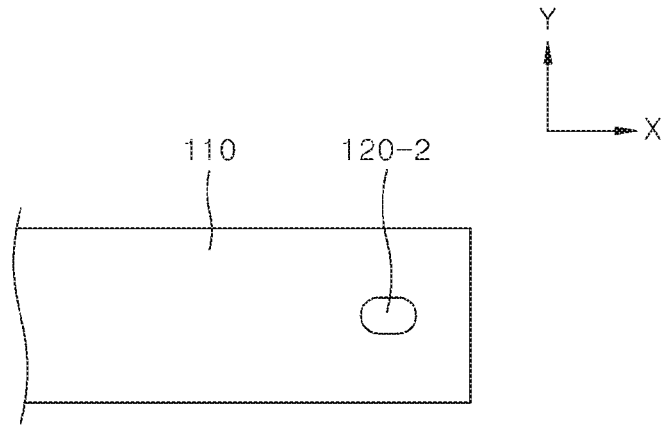
FIGS. 20A and 20B are a top view and a cross-sectional view illustrating a contact protrusion according to a second modified example of the present disclosure.
Figure 20B:
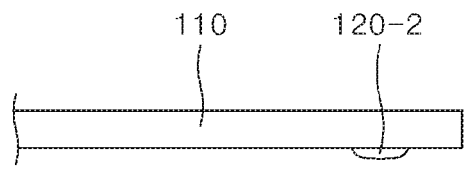

FIGS. 20A and 20B are a top view and a cross-sectional view illustrating a contact protrusion according to a second modified example of the present disclosure.

Referring to FIGS. 20A and 20B, the contact protrusion 120-2 formed at a center region of the front end of the contact 110 according to the second modified example are shown in top view and cross-sectional view.

Referring to FIG. 20A, the illustrated contact protrusion 120-2 may have a round shape elongated along the longitudinal direction (i.e., X-axis direction) of the contact 110, unlike the first modified example.

Referring to FIG. 20B, the contact protrusion 120-2 may be convexly protruded to a dome shape so as to further secure the contact state between the cradle terminals and the breaker terminals, irrespective of whether the cradle terminals 20 (see FIG. 16A) are connected in the X-axis direction or the Y-axis direction (see FIG. 20A).

Figure 21A:
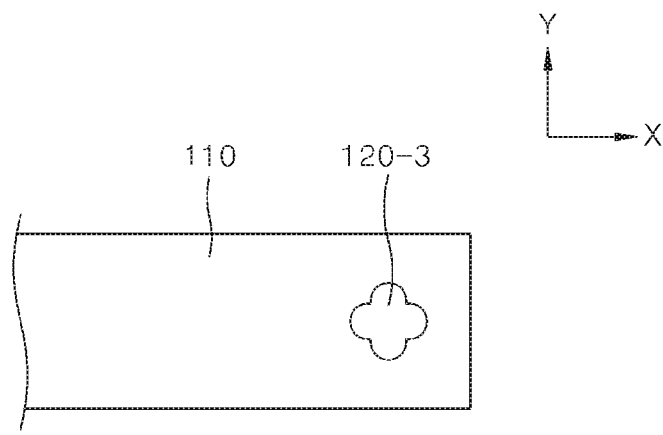
FIGS. 21A and 21B are a top view and a cross-sectional view illustrating a contact protrusion according to a third modified example of the present disclosure.
Figure 21B:
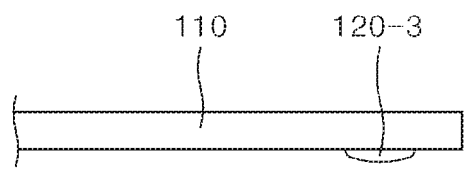

FIGS. 21A and 21B are a top view and a cross-sectional view illustrating a contact protrusion according to a third modified example of the present disclosure.

Referring to FIGS. 21A and 21B, the contact protrusion 120-3 formed at a center region of the front d of the contact 110 according to the third modified example are shown in top view and cross-sectional view.

Referring to FIG. 21A, the illustrated contact protrusion 120-3 may have a round cross ( | )-like shape elongated along the length and width directions (i.e., X- and Y-axis directions) of the contact 110, unlike the first and second modified examples described above.

Referring to FIG. 21B, the contact protrusion 120-3 may be convexly protruded to a dome shape so as to further secure the contact state between the cradle terminals and the breaker terminals, irrespective of whether the cradle terminals 20 (see FIG. 16A) are connected in the X-axis direction or the Y-axis direction (see FIG. 21A).

On the other hand, since the contact area with the terminals may vary depending on various shapes of the contact protrusions as discussed above, the shape of the contact protrusions may possibly be modified within an extent that certain level of conductivity is secured.

The circuit breaker according to embodiments of the present disclosure as described above has an advantage that connection between the terminals may be performed easily irrespective of an arrangement structure of the circuit breaker, i.e., irrespective of whether the circuit breaker has the vertical arrangement or the horizontal arrangement, for example.

Further, the circuit breaker according to embodiments of the present disclosure has an advantage of preventing collision against each other, thereby suppressing breakage of parts and improving the durability of the device when the breaker terminals of the breaker main body and cradle terminals of the cradle are connected.

Furthermore, the circuit breaker according to embodiments of the present disclosure has an advantage of maintaining constant contact state after the breaker terminals of the breaker main body and the cradle terminals of the cradle are connected, thereby ensuring operational reliability and stability.

While the present disclosure has been described with respect to the circuit breaker, it is apparent that various modifications may be made without departing from the scope of the present disclosure.

It is to be understood that the embodiments described above are to be considered in all respects as illustrative and not restrictive, and the scope of the present disclosure is represented by the claims accompanying below rather than the detailed description, the meaning and the scope of the claims, and all the modifications or modified forms that may be derived from the equivalent concepts will have to be interpreted as falling into the scope of the present disclosure.

What is claimed is:

1. A circuit breaker, comprising:
a cradle having a plurality of cradle terminals; and
a breaker main body connected to the cradle and having a plurality of breaker terminals electrically connected to the plurality of cradle terminals,
wherein each of the plurality of breaker terminals comprises:
a terminal body extended from the breaker main body and protruded toward each of the plurality of cradle terminals, contacts coupled to upper and lower portions of the terminal body so as to have an elastic force and disposed in parallel to face each other,
a first contact protrusion protruded to a round shape in an upward direction connected to a lower contact fixed to the lower portion of the terminal body, and
a second contact protrusion protruded to a round shape in a downward direction connected to an upper contact fixed to the upper portion of the terminal body, in which the first contact protrusion and the second contact protrusion face each other such that, upon connection of the plurality of cradle terminals, the first contact protrusion and the second contact protrusion contact and press both sides of the connected cradle terminals,
wherein the lower contact and the upper contact are disposed in parallel to face each other with a wider spacing than a thickness of each of the plurality of cradle terminals, and
the first contact protrusion and the second contact protrusion are protruded with a gap narrower than the thickness of each of the plurality of cradle terminals,
wherein the first contact protrusion comprises a plurality of first contact protrusions for each of a plurality of lower contacts,
wherein the second contact protrusion comprises a plurality of second contact protrusions for each of a plurality of upper contacts, and
the plurality of first contact protrusions and the plurality of second contact protrusions are disposed close to front end portions of the plurality of lower contacts and the plurality of upper contacts,
wherein the cradle and breaker main body are connectable in a transversal arrangement and a longitudinal arrangement, and the contacts are flat, including flat ends interacting with the plurality of cradle terminals.

2. The circuit breaker according to claim 1, wherein the first contact protrusion and the second contact protrusion have a hemispherical shape.

3. A circuit breaker, comprising:
a cradle having a plurality of cradle terminals; and
a breaker main body connected to the cradle and having a plurality of breaker terminals electrically connected to the plurality of cradle terminals,
wherein each of the plurality of breaker terminals comprises:
a terminal body extended from the breaker main body and protruded toward each of the plurality of cradle terminals, contacts coupled to upper and lower portions of the terminal body so as to have an elastic force and disposed in parallel to face each other,
a first contact protrusion protruded in an upward direction connected to a lower contact fixed to the lower portion of the terminal body, and
a second contact protrusion protruded in a downward direction connected to an upper contact fixed to the upper portion of the terminal body, in which the first contact protrusion and the second contact protrusion face each other such that, upon connection of the plurality of cradle terminals, the first contact protrusion and the second contact protrusion contact and press both sides of the connected cradle terminals,
wherein the lower contact and the upper contact are disposed in parallel to face each other with a wider spacing than a thickness of each of the plurality of cradle terminals, and
the first contact protrusion and the second contact protrusion are protruded with a gap narrower than the thickness of each of the plurality of cradle terminals, wherein the first contact protrusion comprises a plurality of first contact protrusions for each of a plurality of lower contacts, wherein the second contact protrusion comprises a plurality of second contact protrusions for each of a plurality of upper contacts, and the plurality of first contact protrusions and the plurality of second contact protrusions are disposed close to front end portions of the plurality of lower contacts and the plurality of upper contacts, wherein the cradle and breaker main body are connectable in a transversal arrangement and a longitudinal arrangement, and the contacts are flat, including flat ends interacting with the plurality of cradle terminals.

4. The circuit breaker according to claim 3, wherein the first contact protrusion and the second contact protrusion are formed such that height thereof gradually increases along a direction toward rear ends of the contacts.

5. The circuit breaker according to claims 3, wherein the first contact protrusion and the second contact protrusion have an inclined surface such that a degree of protrusion is gradually increased along a direction toward the rear ends of the contacts to limit insertion of the connected terminal.

6. The circuit breaker according to claims 3, wherein the first contact protrusion and second contact protrusion have one of a round shape extended along a longitudinal direction of the contacts, a round shape extended along a width direction of the contacts, and a round shape extended respectively along the length and the width directions of the contacts.

\* \* \* \* \*